(12) United States Patent
Robinson

(10) Patent No.: US 9,115,856 B1
(45) Date of Patent: Aug. 25, 2015

(54) SOLAR-POWERED RELOCATABLE LIGHTING SYSTEM

(71) Applicant: Janet K. Robinson, Paducah, KY (US)

(72) Inventor: Janet K. Robinson, Paducah, KY (US)

( * ) Notice: Subject to any disclaimer, the term of this patent is extended or adjusted under 35 U.S.C. 154(b) by 120 days.

(21) Appl. No.: 13/889,417

(22) Filed: May 8, 2013

(51) Int. Cl.
| F21L 4/08 | (2006.01) |
| F21V 21/14 | (2006.01) |
| F21V 17/00 | (2006.01) |
| F21V 17/14 | (2006.01) |

(52) U.S. Cl.
CPC .................. *F21L 4/08* (2013.01); *F21V 17/002* (2013.01); *F21V 17/14* (2013.01); *F21V 21/14* (2013.01)

(58) Field of Classification Search
CPC .............. F21Y 2101/0261; F21Y 2101/02; F21V 21/08; F21V 21/14; F21V 21/00; F21V 17/002; F21V 17/06; F21V 17/10; F21V 17/14; F21V 21/145; F21L 13/00; F21L 4/08
USPC .......... 362/157, 388, 410, 414, 431, 647, 649
See application file for complete search history.

(56) References Cited

U.S. PATENT DOCUMENTS

| 6,082,877 | A | * | 7/2000 | Hughes ........................ 362/360 |
| 6,450,672 | B2 | * | 9/2002 | Gismondi .................... 362/427 |
| 7,322,735 | B1 | * | 1/2008 | Caldani et al. .............. 362/648 |
| 7,524,079 | B2 | * | 4/2009 | Greenhoe .................... 362/183 |
| D621,804 | S | * | 8/2010 | Sip et al. ...................... D13/182 |
| 7,887,214 | B2 | | 2/2011 | Chang et al. |
| 8,157,406 | B2 | | 4/2012 | Zheng et al. |
| 8,186,845 | B2 | | 5/2012 | Zheng |
| 8,192,044 | B2 | * | 6/2012 | Allsop et al. ................. 362/183 |
| 8,201,963 | B2 | * | 6/2012 | Peterson ....................... 362/183 |
| 8,684,554 | B2 | * | 4/2014 | Jensen et al. ................. 362/183 |
| 2006/0072327 | A1 | * | 4/2006 | Schaak ........................ 362/382 |
| 2009/0207597 | A1 | | 8/2009 | Silver |
| 2011/0013385 | A1 | | 1/2011 | Chien |
| 2011/0156479 | A1 | * | 6/2011 | Carroll ........................... 307/18 |

* cited by examiner

*Primary Examiner* — Alan Cariaso
*Assistant Examiner* — Colin Cattanach
(74) *Attorney, Agent, or Firm* — Robert C. Montgomery; Montgomery Patent Design LP.

(57) ABSTRACT

A solar-powered relocatable lighting system includes a light module including a support frame having a light-emitting diode module, rechargeable batteries, and photovoltaic panels, a removable shade assembly configured to cover the light module, and a plurality of support arms configured to removably connect to the support frame of the light module. The plurality of support arms provides multiple configurations for use and charging the solar-powered relocatable lighting system.

20 Claims, 3 Drawing Sheets

SOLAR-POWERED RELOCATABLE LIGHTING SYSTEM

RELATED APPLICATIONS

Not applicable.

FIELD OF THE INVENTION

The present invention relates generally to light systems, and in particular, to a solar-powered relocatable lighting system having multiple in-use configurations.

BACKGROUND OF THE INVENTION

With the recent hike in energy costs, many people are reexamining their home energy usage in an effort to save on the family budget. Electric lighting is one of the largest users contributing to the home electric bill. Many consumers have turned to the use of light-emitting diode (LED) lamps to save on power usage due to their high efficiencies. However, even the most efficient LED lamp still requires some electrical power which is reflected in the monthly power bill. Additionally, such lamps will not work at all during a power outage.

Prior lighting devices fail to provide a complete and integrated lighting system that is robust to accommodate indoor use, outdoor use, solar recharging, and LED illumination. Prior art also fails to enable a user to use such lighting during times when access to electrical power is limited.

Accordingly, there exists a need for a lighting system that provides indoor and outdoor lighting, which does not require conventional electrical power.

SUMMARY OF THE INVENTION

The disclosed solar powered relocatable lighting system relates to a solar-powered relocatable indoor lighting system that affords the ability to configure and re-configure the system for outdoor use and multiple indoor uses. The system can include an interchangeable solar-powered light module, a decorative shade assembly, a locking pole assembly, a base module, a control switch, a rechargeable battery, a plurality of individual photovoltaic panels, a gooseneck arm, a ground stake, and a light-emitting diode module. The interchangeable solar-powered light module is located inside of the decorative shade assembly, and is supported by a locking pole arm assembly connecting it to a base module by use of a snap twist fitting at both the interchangeable solar powered light module and the base module locations. The snap twist fitting connection is a hand-twist to lock arrangement. The base module serves to provide adequate stability and support for the system. The interchangeable solar-powered light module includes a supporting frame structure having a top snap fitting and a lower snap fitting. A control switch is located at the top of the interchangeable solar-powered light module and is in electrical connection with the internal circuitry. The upper portion of the supporting frame structure is provided with rechargeable single cell batteries. The lower portion of the supporting frame structure is provided with a plurality of individual photovoltaic panels. The light-emitting diode module includes multiple light-emitting diodes and is located at a lower surface of the interchangeable solar-powered light module. Electrical power from the photovoltaic panels is directed to a solar charge controller, which generates the proper charging current regardless of the output of the individual photovoltaic panels. The output from the solar charge controller is directed to the rechargeable single cell batteries.

In one (1) embodiment of the disclosed solar powered relocatable lighting system, the interchangeable solar-powered light module is supported by a ground stake that connects into the lower snap fitting. The ground stake has a tapered point at one (1) distal end to pierce the ground. The ground stake is inserted into the ground, and the light module system is connected to the ground stake. The configured unit is then placed in an outdoor area during a time when sufficient sunlight is shining in order to charge the rechargeable batteries.

In another embodiment of the disclosed solar powered relocatable lighting system, the interchangeable solar-powered light module is removed from the ground stake and the system is re-configured for indoor use in a table lamp configuration. The locking pole assembly is attached into the lower snap fitting on the interchangeable solar-powered light module. The base module is attached to the lower portion of the locking pole arm assembly. The decorative shade assembly is placed over the top of the interchangeable solar-powered light module. The re-configured unit can be placed on top of a table for display and use by operation of the control switch.

In another embodiment of the disclosed solar-powered relocatable lighting system, the system is used in a desk lamp configuration. The decorative shade assembly is attached as in the table top configuration. A top portion of the gooseneck arm assembly is attached to the top snap fitting and a bottom portion of the gooseneck arm is attached to the base module. The re-configured unit can be placed on top of a desk for display and use by operation of the control switch.

The disclosed solar-powered relocatable lighting system includes three (3) different usable configurations, which exploit the solar powering aspects of photovoltaic panels and the lighting aspects of a lamp. In addition to using the system to generate and project light, the system can be taken outside during the day and placed in the sun to charge the batteries. The system can be set on a flat surface or can be provided with a spiked support pole to allow for use on grassy surfaces. Electrical contacts connect the battery pack to a lighting circuit having an LED lamp array as well as control switch. Power provided by the battery pack is sufficient to last all night. Such features are envisioned as beneficial during a power outage, homes that are not connected to the power grid, while camping, or those simply looking to save on their electrical bill.

Furthermore, the described features and advantages of the disclosed solar powered relocatable lighting system can be combined in various manners and embodiments as one skilled in the relevant art will recognize after reading the present disclosure. The disclosure can be practiced without one (1) or more of the features and advantages described in any particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
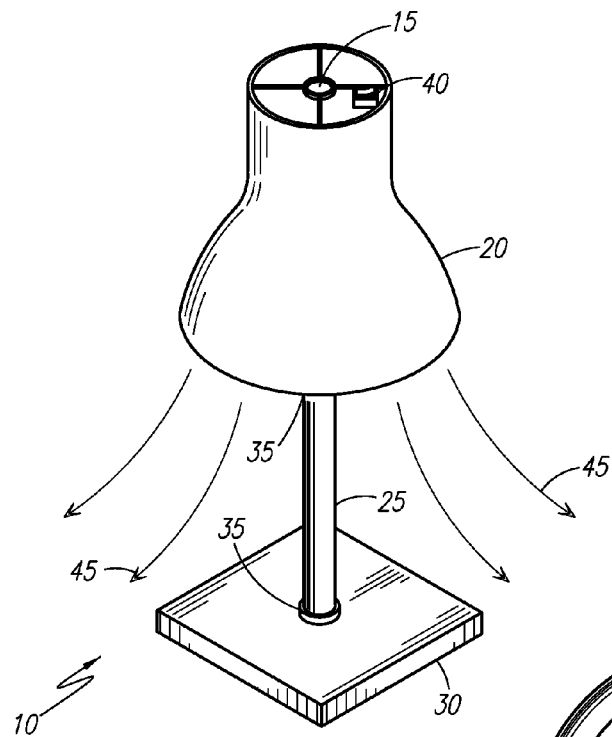
FIG. 1 is an isometric view of one embodiment of the disclosed solar-powered relocatable lighting system in accordance with the present invention.

DESCRIPTIVE KEY 10 solar-powered relocatable indoor lighting system
15 interchangeable solar-powered light module
20 decorative shade assembly
25 pole arm assembly
30 base module
35 snap twist fitting
40 ON/OFF switch
45 light rays
50 gooseneck arm assembly
55 supporting frame structure
60 top snap fitting
65 lower snap fitting
70 rechargeable single cell battery
75 individual photovoltaic panel
80 ground stake
85 tapered point
90 ground surface
95 light-emitting diode module
100 light-emitting diode
105 solar charge controller
110 light-emitting diode driving circuit

DETAILED DESCRIPTION OF THE PREFERRED EMBODIMENT

In accordance with the invention, the best mode is presented in terms of the described embodiments, herein depicted within FIGS. 1 through 5. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Referring now to FIGS. 1-5, disclosing a solar powered relocatable lighting system (herein described as a system") 10, where like reference numerals represent similar or like parts. The system 10 includes three different usable configurations and one charging configuration, which exploit the solar powering aspects of photovoltaic panels and the lighting aspects of a lamp.

Referring to FIG. 1, the system 10 includes an interchangeable solar-powered light module 15 located inside of a decorative shade assembly 20. It should be noted that most of the interchangeable solar powered light module 15 is hidden from view in FIG. 1 due to illustrative limitations and will be described in greater detail herein below. The interchangeable solar powered light module 15 and subsequently the decorative shade assembly 20 is supported by support arm assembly. The shade assembly 20 includes a substantially bell-shaped shell defining a hollow interior configured to receive the solar-powered light module. The support arm assembly is a locking pole arm assembly 25 that connects to a base module 30 at a lower end and the solar powered light module 15 at an upper end by use of a snap twist fitting 35. The pole arm assembly 25 includes a straight cylindrical body extending between an upper end and a lower end. The connection afforded by the snap twist fitting 35 is a simple twist to lock arrangement and can be made by hand without the use of tools. The material of construction used on the decorative shade assembly 20, the locking pole arm assembly 25, and the base module 30 are envisioned to be plastic, although other materials such as metal, glass, and even wood could be utilized as well, and as such, should not interpreted as a limiting factor of the present disclosure.

The base module 30 is of a substantial weight such as to provide stability for the system 10. The overall height of the system 10 is envisioned as approximately eighteen inches (18 in.), although other sizes could be adapted easily by those familiar in the art. The system 10 is provided with an ON/OFF switch 40 located at the top of the interchangeable solar-powered light module 15. The system 10 produces light rays 45 that emanate in a downward pattern as shown. As such, the system 10 is suitable for general area illumination such as would be produced by a conventional table lamp.

Figure 2:
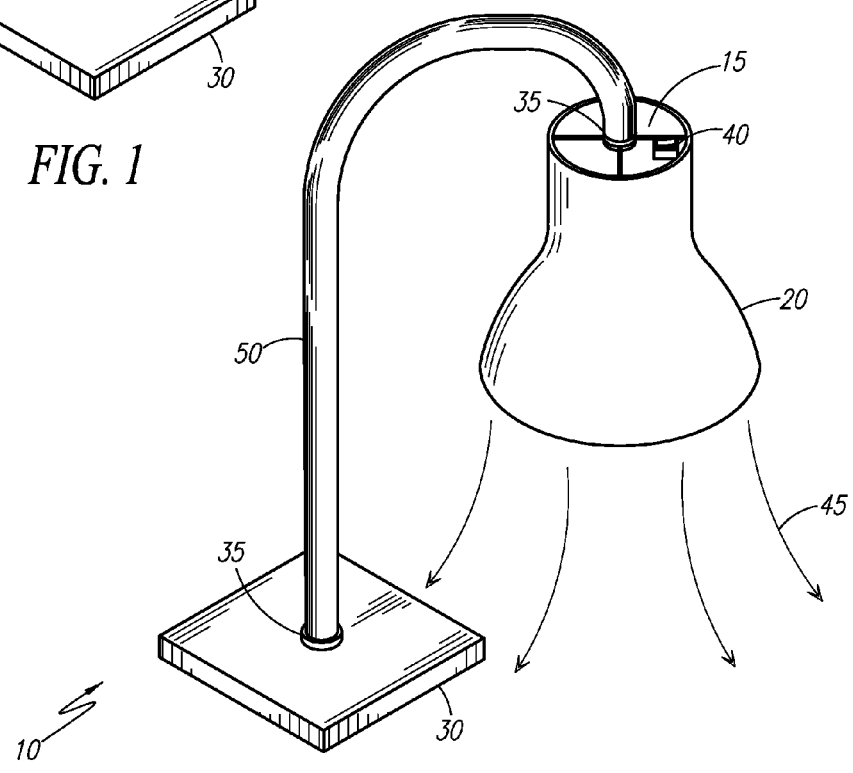
FIG. 2 is an isometric view of another embodiment the disclosed solar-powered relocatable indoor lighting system.

Referring next to FIG. 2, the system 10 includes the interchangeable solar-powered light module 15 located inside of the decorative shade assembly 20. As in FIG. 1, most of the interchangeable solar-powered light module 15 is hidden from view due to illustrative limitations and will be described in greater detail herein below. The interchangeable solar-powered light module 15 and subsequently the decorative shade assembly 20 is supported by the support arm assembly. The support arm assembly is a gooseneck arm assembly 50 that connects to the base module 30 at an upper end and the solar-powered light module 15 at a lower end by use of a snap twist fitting 35. The gooseneck arm assembly includes a lower portion, a bent portion, and an upper portion. The bent portion extends between the lower portion and the upper portion such that the lower portion and the upper portion are substantially parallel. The connection afforded by the snap twist fitting 35 is a simple twist to lock arrangement, and can be made by hand without the use of tools. The material of construction used on the gooseneck arm assembly 50 is envisioned to be plastic, although other materials such as metal, glass, and even wood could be utilized as well, and as such, should not interpreted as a limiting factor of the present disclosure. The overall height of the system 10 of the illustrated embodiment is envisioned as approximately eighteen inches (18 in.), although other sizes could be adapted easily by those familiar in the art. The ON/OFF switch 40 is located in an easily reached operating position at the top of the interchangeable solar-powered light module 15. The system 10 produces light rays 45 that emanate in a downward pattern as shown. As such, the system 10 is suitable for specific task area illumination such as would be produced by a conventional desk lamp.

Figure 3:
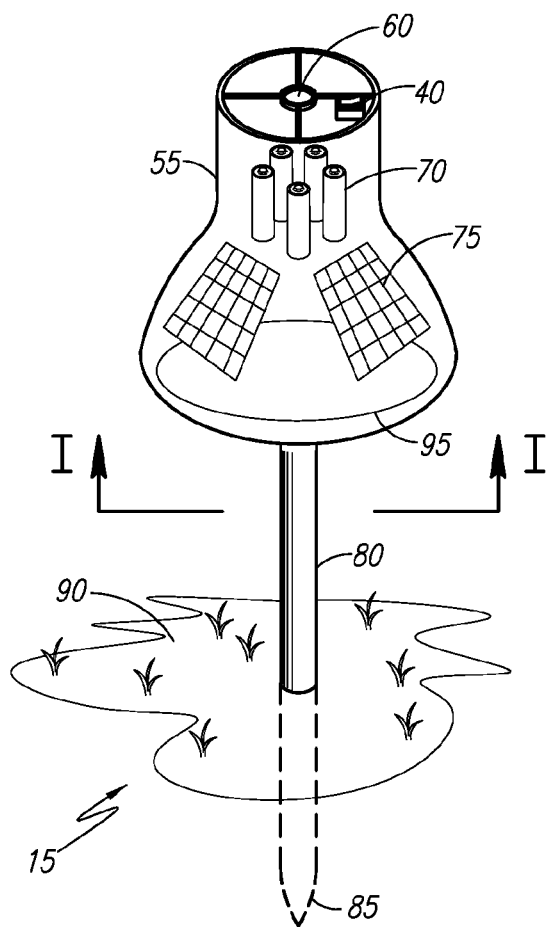
FIG. 3 is an isometric view of the interchangeable solar-powered light module of the disclosed solar powered relocatable lighting system shown in an outdoor location during a charging cycle.

Referring now to FIG. 3, the interchangeable solar-powered light module 15 includes a supporting frame structure 55 which is generally skeleton like in nature. The support frame 15 includes a substantially bell-shaped shell defining an upper end, a lower end, and a hollow interior. The supporting frame structure 55 provides for a top snap fitting 60 disposed centrally about the supporting frame upper end and a lower snap fitting 65 disposed centrally about the supporting frame lower end (not visible in FIG. 3 due to illustrative limitations). In addition to housing the ON/OFF switch 40, the upper portion of the supporting frame structure 55 also houses a multitude of rechargeable single cell batteries 70. The rechargeable single cell batteries 70 can be of multiple variations such as nickel cadmium, nickel metal hydride, lithium ion, sealed lead acid, and the like.

The lower portion of the supporting frame structure 55 is provided with a plurality of individual photovoltaic panels 75 (of which only two (2) are shown in FIG. 3 due to illustrative limitations). The individual photovoltaic panels 75 are located on the angled surface of the interchangeable solar-powered light module 15 so as to be more directly facing the incoming rays of the sun leading to higher solar output. The interchangeable solar-powered light module 15 is supported by a ground stake 80 that connects into the lower snap fitting 65 (not visible in FIG. 3 due to illustrative limitations).

The ground stake 80 is provided with a tapered point 85 to facilitate its installation or piercing of a ground surface 90.

A light-emitting diode module 95 is located at the bottom of the interchangeable solar-powered light module 15, whose details and purpose will be further illustrated herein below. The interchangeable solar-powered light module 15 would be connected to the ground stake 80 and installed outdoors during daytime hours for the purposes of charging the rechargeable single cell batteries 70. As such it would be located in direct sunlight so as to afford the maximum sun exposure at all times.

Figure 4:
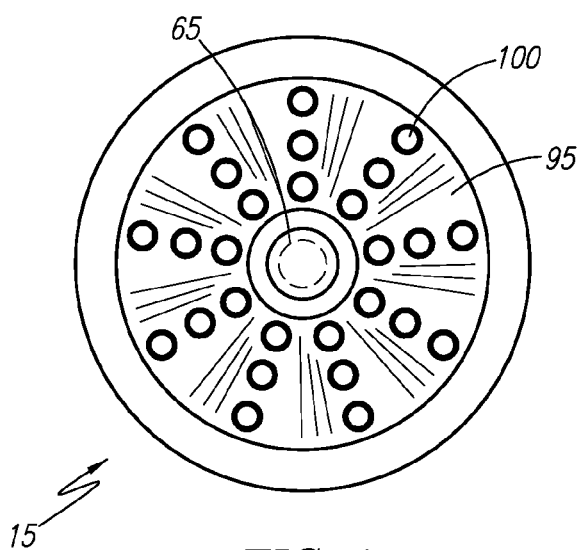
FIG. 4 is a cross-sectional view of the interchangeable solar-powered light module as seen along a line I-I of FIG. 3; and, FIG. 5 is an electrical schematic diagram depicting the major electrical components of the disclosed solar-powered relocatable indoor lighting system.

FIG. 4 more clearly depicts the outer frame work of the interchangeable solar-powered light module 15 about a perimeter. The lower snap fitting 65 is visible in the center of the interchangeable solar-powered light module 15. The light-emitting diode module 95 is located such that it covers the vast majority of the lower surface of the interchangeable solar powered light module 15. As such, it can easily generate the light rays 45 (FIG. 1 and FIG. 2) when used in an inside location. The light-emitting diode module 95 includes multiple light-emitting diodes 100 arranged in a radial configuration. The exact quantity of light-emitting diodes 100 will vary depending on the type of light-emitting diodes 100 used as well as the overall circuit design, as well as being governed by the desired light output. As such, the exact configuration of the light-emitting diodes 100 as provided in the light-emitting diode module 95 is not intended to be a limiting factor of the present disclosure.

Figure 5:
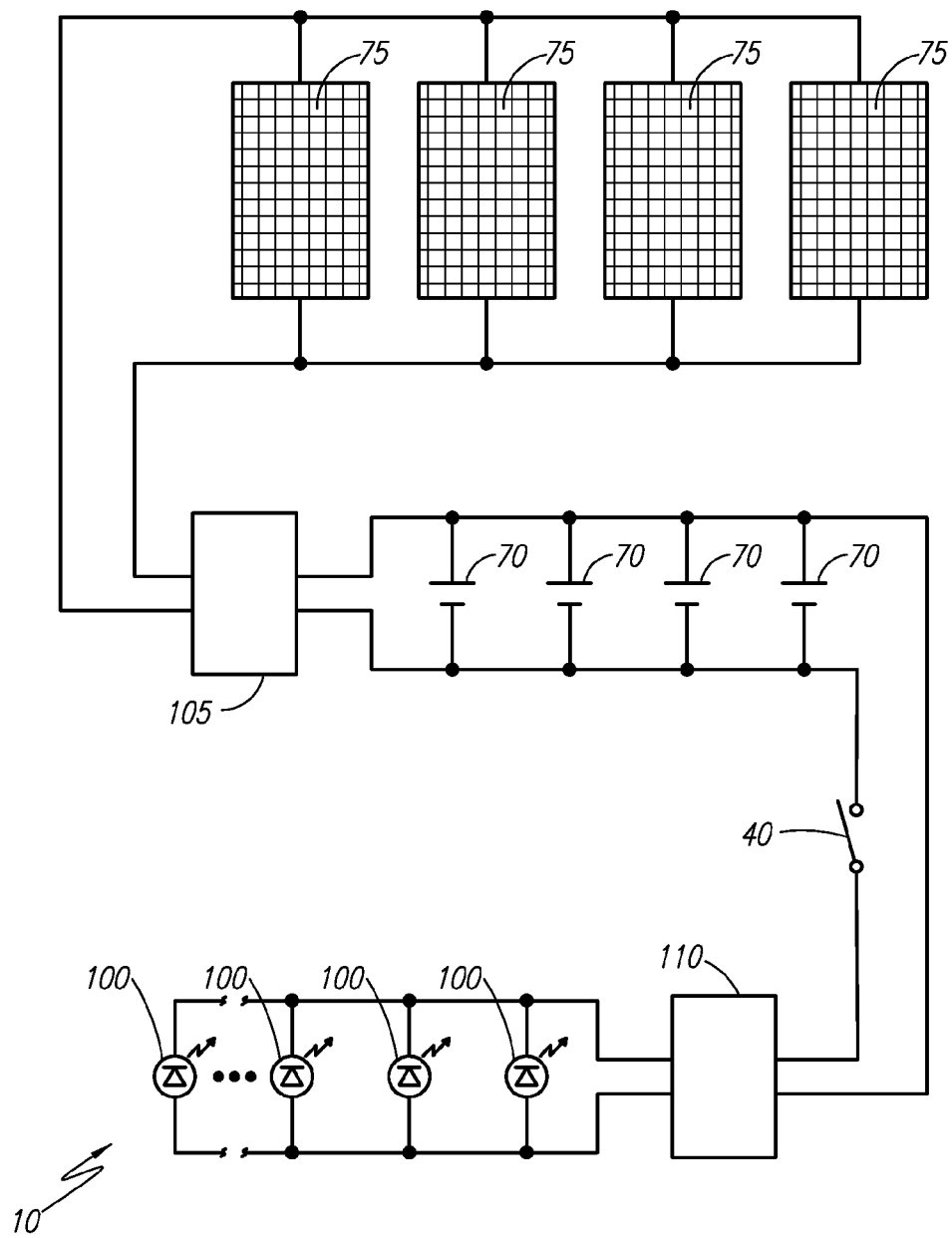

Referring to FIG. 5, electrical power from each of the individual photovoltaic panels 75 is directed to a solar charge controller 105 by way of a parallel path connection. The solar charge controller 105 will generate the proper charging current regardless of the output of the individual photovoltaic panels 75 which will vary over time due to changes in the sun's rays over time. The output from the solar charge controller 105 is directed to the bank of rechargeable single cell batteries 70, also in a parallel path connection. The exact quantity of rechargeable single cell batteries 70 will vary as per the design requirements of the solar charge controller 105, the power usage of the system 10, as well as the storage capacity of each rechargeable single cell batteries 70. Such design parameters are well known in the art and will follow basic design characteristics.

The output of the rechargeable single cell batteries 70 is connected into the ON/OFF switch 40 which regulates power flow into a light-emitting diode driving circuit 110. The light-emitting diode driving circuit 110 will generate the proper voltage and current as required by the light-emitting diodes 100. The solar charge controller 105 and the light-emitting diode driving circuit 110 are located inside of the interchangeable solar-powered light module 15 (FIG. 3). The configuration as depicted by FIG. 5 is one (1) of many currently known within the art and such specific application is not intended to be a limiting factor of the present disclosure.

It is envisioned that other styles and configurations of the disclosed system 10 can be easily incorporated into the teachings of the present disclosure, and only certain particular configurations have been shown and described for purposes of clarity and disclosure and not by way of limitation of scope.

The disclosed system 10 can be configured and utilized by the user in a simple and effortless manner with little or no training. After initial purchase or acquisition of the system 10, it can be installed and utilized as indicated in FIGS. 1-3.

Initial usage of the system 10 would commence by taking the interchangeable solar powered light module 15 and connecting it to the ground stake 80 as shown in FIG. 3. The attached assembly would then be placed in an outdoor location where it would be struck by the rays of the sun though out the daytime hours. At dusk the interchangeable solar-powered light module 15 would be removed from the ground stake 80 and the interchangeable solar-powered light module 15 brought indoors.

Once indoors, the user would make the choice to utilize the interchangeable solar-powered light module 15 in a table lamp configuration as shown in the embodiment of FIG. 1 or in a desk lamp configuration as shown in the embodiment of FIG. 2. To use it in the table lamp configuration, the user would attach the locking pole arm assembly 25 into the lower snap fitting 65 on the interchangeable solar-powered light module 15. Next the base module 30 would be attached to the lower portion of the locking pole arm assembly 25. Finally, the decorative shade assembly 20 is placed over the top of the interchangeable solar-powered light module 15 where it is held in place by friction fit. The completed assembly would then be placed on a table, dresser or other location and activated by the ON/OFF switch 40 to produce light rays 45. It is envisioned that the power output of the rechargeable single cell batteries 70 would be adequate to power the light-emitting diodes 100 for the hours of darkness during a typical nighttime. At dawn, the base module 30, the decorative shade assembly 20, and the locking pole arm assembly 25 are removed and the interchangeable solar-powered light module 15 placed once again outdoors upon the ground stake 80 in a repeating cycle.

Should the interchangeable solar-powered light module 15 be used in a desk lamp configuration as shown in the embodiment of FIG. 2, the user would first attach the decorative shade assembly 20 over the interchangeable solar-powered light module 15. Next, the gooseneck arm assembly 50 would be attached to the top snap fitting 60 of the interchangeable solar-powered light module 15 with the lower end of the gooseneck arm assembly 50 attached to the base module 30. The completed assembly would then be placed on a desk, countertop, workbench or other location where specific tasks are performed. It would be activated by the ON/OFF switch 40 to produce light rays 45. It is envisioned that the power output of the rechargeable single cell batteries 70 would be adequate to power the light-emitting diodes 100 for the hours of darkness during a typical nighttime. At dawn, the base module 30, the decorative shade assembly 20, and the gooseneck arm assembly 50 are removed and the interchangeable solar-powered light module 15 placed once again outdoors upon the ground stake 80 in a repeating cycle.

The foregoing embodiments of the disclosed solar powered relocatable lighting system have been presented for purposes of illustration and description. They are not intended to be exhaustive or to limit the invention and method of use to the precise forms disclosed. It can be appreciated by one skilled in the art that other styles, configurations, and modifications of the invention can be incorporated into the teachings of the present disclosure upon reading the specification and that the embodiments shown and described are for the purposes of clarity and disclosure and to limit the scope. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claim.

What is claimed is:

1. A solar powered relocatable lighting system comprising:
a solar-powered light module having a support frame;
a shade assembly configured to cover said solar-powered light module;
a support arm having a support arm upper end and a support arm lower end;
a plurality of snap-fittings connected to said solar-powered light module;
wherein said plurality of snap fittings comprises:
a top snap fitting disposed centrally about said support frame upper end, said top snap fitting being configured to receivably connect to said support arm upper end from above said solar-powered light module;
a lower snap fitting disposed centrally about said support frame lower end, said lower snap fitting being configured to receivably connect to said support arm upper end from below said solar-powered light module;
a base module removably connected to said support arm lower end, said base module comprising a planar bottom surface configured to contact a substantially planar support surface.

2. The system of claim 1, wherein said upper end of said support arm comprises a snap twist fitting; and, wherein said snap twist fitting of said upper end of said support arm is connectable to said snap fitting.

3. The system of claim 1, wherein said lower end of said support arm comprises a snap twist fitting; wherein said base module comprises a snap fitting; and wherein said snap twist fitting of said lower end of said support arm is connectable to said snap fitting of said base module.

4. The system of claim 1, wherein said support arm comprises a pole arm assembly comprising a straight cylindrical body extending between said upper end and said lower end; and, wherein said upper end of said pole arm assembly is removably connected to said snap fitting from below.

5. The system of claim 1, wherein said base module comprises a sufficient weight to stabilize said support arm, said solar-powered light module, and said shade assembly upon connection to said base module.

6. The system of claim 1, wherein said support arm comprises a gooseneck arm assembly comprising a lower portion, a bent portion, and an upper portion, said bent portion extending between said lower portion and said upper portion such that said lower portion and said upper portion are substantially parallel; and, wherein said upper end of said gooseneck arm assembly is removably connected to said snap fitting from above.

7. The system of claim 1, wherein said shade assembly comprises a substantially bell-shaped shell defining a hollow interior configured to receive said solar-powered light module.

8. The system of claim 1, wherein said solar-powered light module comprises:
wherein said support frame comprises a substantially bell-shaped shell defining said upper end, said lower end, and a hollow interior;
a light-emitting diode module disposed about said support frame lower end;
a plurality of rechargeable batteries disposed within said support frame hollow interior, said plurality of rechargeable batteries being electrically connected to said light emitting diode module; and
a plurality of photovoltaic panels disposed on an exterior of said support frame, said plurality of photovoltaic panels being electrically connected to said plurality of rechargeable batteries.

9. The system of claim 8, wherein said plurality of photovoltaic panels are located on outwardly angled surfaces of said support frame.

10. The system of claim 8, wherein said light-emitting diode module covers a substantial portion of a lower surface of said support frame, said lower snap fitting being disposed about a middle of said light-emitting diode module.

11. The system of claim 8, wherein said light emitting diode module comprises a plurality of light-emitting diodes.

12. The system of claim 11, wherein said plurality of light-emitting diodes are arranged radially about a middle of said light-emitting diode module.

13. The system of claim 11, wherein said light-emitting diode module further comprises a light-emitting diode driving circuit electrically connected between said plurality of light-emitting diodes and said plurality of rechargeable batteries, said light-emitting diode driving circuit being configured to generate a voltage to said plurality of light-emitting diodes; and,
wherein said plurality of light-emitting diodes are electrically connected to said light-emitting diode driving circuit in parallel.

14. The system of claim 13, wherein said solar-powered light module further comprises a power switch disposed about said support frame upper end, said power switch electrically connected between said plurality of rechargeable batteries and said light-emitting diode driving circuit.

15. The system of claim 8, wherein said solar-powered light module further comprises a solar charge controller electrically connected between said plurality of photovoltaic panels and said plurality of rechargeable batteries, said solar charge controller being configured to generate a charging current;
 wherein said plurality of photovoltaic panels are electrically connected to said solar charge controller in parallel; and,
 wherein said plurality of rechargeable batteries are electrically connected to said solar charge controller in parallel.

16. The system of claim 1, wherein said support arm comprises a ground stake assembly comprising a straight cylindrical body extending between said upper end and said lower end; wherein said lower end of said ground stake assembly comprises a tapered point configured to to be inserted into a ground surface; and, wherein said upper end of said ground stake assembly is removably connected to said snap fitting from below.

17. A solar-powered relocatable lighting system comprising:
 a solar-powered light module comprising:
  a support frame comprising a substantially bell-shaped shell defining an upper end, a lower end, and a hollow interior;
  a support arm having a support arm upper end and a support arm lower end;
  a top snap fitting disposed centrally about said support frame upper end, said top snap fitting being configured to receivably connect to said support arm upper end from above said solar-powered light module;
  a lower snap fitting disposed centrally about said support frame lower end, said lower snap fitting being configured to receivably connect to said support arm upper end from below said solar-powered light module;
  a light-emitting diode module disposed centrally about said support frame lower end;
  a plurality of rechargeable batteries disposed within said support frame hollow interior, said plurality of rechargeable batteries being electrically connected to said light emitting diode module;
  a plurality of photovoltaic panels disposed on an exterior of said support frame, said plurality of photovoltaic panels being electrically connected to said plurality of rechargeable batteries;
  a shade assembly comprising a substantially bell-shaped shell defining a hollow interior configured to receive said support frame;
  wherein said support arm is one from the group comprising: a pole arm assembly comprising a straight cylindrical body, an upper end configured to removably connect to said lower snap fitting from below said solar-powered light module, and an opposing lower end; or a gooseneck arm assembly comprising a lower portion having a lower end, a bent portion, and an upper portion having an upper end configured to removably connect to said upper snap fitting from above said solar-powered light module, said bent portion extending between said lower portion and said upper portion such that said lower portion and said upper portion are substantially parallel; and,
  a base module comprising a planar bottom surface configured to contact a substantially planar support surface, said base module configured to removably connect to said pole arm assembly lower end or said gooseneck arm assembly lower end.

18. The system of claim 17, wherein said light-emitting diode module comprises a plurality of light-emitting diodes covering a substantial portion of a lower surface of said support frame, said lower snap fitting being disposed about a middle of said light-emitting diode module.

19. The system of claim 18, wherein said light-emitting diode module further comprises a light-emitting diode driving circuit electrically connected between said plurality of light-emitting diodes and said plurality of rechargeable batteries, said light-emitting diode driving circuit being configured to generate a voltage to said plurality of light-emitting diodes, said plurality of light-emitting diodes being electrically connected to said light-emitting diode driving circuit in parallel;
 wherein said solar-powered light module further comprises:
  a power switch disposed about said support frame upper end, said power switch being electrically connected between said plurality of rechargeable batteries and said light-emitting diode driving circuit; and,
  a solar charge controller electrically connected between said plurality of photovoltaic panels and said plurality of rechargeable batteries, said solar charge controller being configured to generate a charging current;
 wherein said plurality of photovoltaic panels are electrically connected to said solar charge controller in parallel; and,
 wherein said plurality of rechargeable batteries are electrically connected to said solar charge controller in parallel.

20. The system of claim 19, wherein said support arm group further comprises: a ground stake having an upper end configured to removably connect to said lower snap fitting from below said solar-powered light module and an opposed lower end configured to be inserted into a ground surface, said ground stake lower end comprising a tapered point configured to pierce said ground surface.

* * * * *